United States Patent
Friedrich et al.

(10) Patent No.: US 12,018,932 B2
(45) Date of Patent: Jun. 25, 2024

(54) DETERMINING THE ORIENTATION OF AT LEAST ONE OBJECT AND METHOD FOR RELATIVELY ORIENTING ROLLERS

(71) Applicant: SMS GROUP GMBH, Düsseldorf (DE)

(72) Inventors: Martin Friedrich, Ratingen (DE); Frank Mönsters, Stadtlohn (DE); Tobias Höhne, Coesfeld (DE); Norman Giesen, Krefeld (DE)

(73) Assignee: SMS GROUP GMBH, Düsseldorf (DE)

( * ) Notice: Subject to any disclaimer, the term of this patent is extended or adjusted under 35 U.S.C. 154(b) by 884 days.

(21) Appl. No.: 17/055,244

(22) PCT Filed: Apr. 18, 2019

(86) PCT No.: PCT/EP2019/060175
§ 371 (c)(1),
(2) Date: Nov. 13, 2020

(87) PCT Pub. No.: WO2019/219331
PCT Pub. Date: Nov. 21, 2019

(65) Prior Publication Data
US 2021/0215477 A1 Jul. 15, 2021

(30) Foreign Application Priority Data

May 14, 2018 (DE) .................... 10 2018 207 424.0
Nov. 6, 2018 (DE) .................... 10 2018 218 910.2

(51) Int. Cl.
*G01B 11/27* (2006.01)
*B22D 11/20* (2006.01)

(52) U.S. Cl.
CPC .......... *G01B 11/272* (2013.01); *B22D 11/208* (2013.01)

(58) Field of Classification Search
CPC ....... G01B 11/272; G01B 11/04; G01B 11/10; G01B 11/24; B22D 11/208
(Continued)

(56) References Cited

U.S. PATENT DOCUMENTS

| 7,537,045 B2 | 5/2009 | Von Wyl |
| 2014/0068958 A1 | 3/2014 | Kubo |
| 2015/0308818 A1 | 10/2015 | Bridges |

FOREIGN PATENT DOCUMENTS

| AT | 509606 A4 | 10/2011 |
| DE | 102009060638 A1 | 9/2010 |

(Continued)

OTHER PUBLICATIONS

"3-D-Koordinatenmesstrechnik . . . " Stahl und Eisen; 2011 Heft 2, pp. 39-45.

*Primary Examiner* — Daniel L Murphy
(74) *Attorney, Agent, or Firm* — LUCAS & MERCANTI, LLP; Klaus P. Stoffel (57) ABSTRACT

A device for determining orientation of an object, including a measurement body, which reflects electromagnetic radiation and can be brought into physical contact with a surface of the object to determine the orientation. The device includes: a measurement carriage movable along the object during the determination of the orientation and which has a sliding surface that can be brought into physical contact with the object; a retaining unit which retains the measurement body and is connected to the measurement carriage so as to be pivotable between a maximal position, in which the measurement body protrudes beyond the sliding surface on the object side, and a minimal position, in which the measurement body does not protrude beyond the sliding surface on the object side; and a restoring device that applies a force to the retaining unit toward the maximal position.

7 Claims, 4 Drawing Sheets

(58) Field of Classification Search
USPC .................................................... 356/152.3
See application file for complete search history.

(56) References Cited

FOREIGN PATENT DOCUMENTS

| | | |
|---|---|---|
| DE | 102012223457 A1 | 12/2013 |
| DE | 102015224893 A1 | 6/2017 |
| EP | 1768798 B1 | 4/2007 |
| EP | 2574412 B1 | 6/2014 |
| WO | 2007017030 A1 | 2/2007 |
| WO | 2013186007 A1 | 12/2013 |

DETERMINING THE ORIENTATION OF AT LEAST ONE OBJECT AND METHOD FOR RELATIVELY ORIENTING ROLLERS

CROSS-REFERENCE TO RELATED APPLICATIONS

The present application is a 371 of International application PCT/EP2019/060175, filed Apr. 18, 2019, which claims priority of DE 10 2018 207 424.0, filed May 14, 2018, and DE 10 2018 218 910.2, filed Nov. 6, 2018, the priority of these applications is hereby claimed and these applications are incorporated herein by reference.

BACKGROUND OF THE INVENTION

The invention relates to a device for determining an alignment of at least one object, comprising at least one measuring body, which reflects electromagnetic radiation and can be brought into physical contact with a surface of the object to determine the alignment. Furthermore, the invention relates to a system for determining an alignment of at least one object, comprising at least one laser tracker and at least one evaluation device, which evaluates measuring signals of the laser tracker. Moreover, the invention relates to a method for relatively aligning rollers of a segment of a roller guide and aligning mold plates of a mold.

In particular in continuous casting installations, it is required to align rollers of a roller segment of a strand guide for guiding a cast metal strand and also the roller segments in relation to one another as precisely as possible. To perform this relative alignment, it is known to determine the position of the individual rollers or roller segments by using a laser scanner or by a plumb measurement in which a wire is stretched out and measurements are taken against the stretched-out wire. Alternatively, it is known to determine the position of the individual rollers or roller segments by using other mechanical aids, such as for example by using straightedges, special measuring surfaces on or in the object to be measured, theodolites, leveling instruments or batter boards. This usually takes place on the basis of reference marks that are not fixed in relation to the ideal dimensional reference line of the installation, i.e. generally the registration line of the trailing edge of the metal strand (thermal expansions, foundation settlements).

Each individual measurement only produces in each case two of three spatial coordinates of a measuring point. The full determination of a measuring point in space takes place by cross-correlation, which is usually performed manually with a pocket calculator. As a check following an optical measurement, often the transitions between the mold and the segment and from segment to segment are re-measured by means of templates. This frequently finds discrepancies between the expected results from the roller plan, i.e. the theoretical desired positions, the measurement results and the results from the check.

To achieve an optimum adjustment of the individual positions of the mold and the roller segments, a very great effort is required. Typically, the alignment of all the roller segments of a continuous casting installation takes about two weeks. Furthermore, erroneous alignments cannot always be avoided entirely, which is caused as a consequence of quality problems and production restrictions. The consequential costs of inadequate alignment of the individual roller segments of the continuous casting installation are correspondingly high.

To eliminate detected incorrect positions of the mold or the roller segments, in particular detected transition errors, by so-called re-truing, the mold and/or segments must be taken away by means of a crane or manipulator and placed elsewhere. Then, elements serving for positioning are removed and/or changed and re-fitted and secured. After that, the mold or the roller segment can be re-fitted. Since often only a single crane or a single manipulator is available, all of the roller segments must be aligned one after the other.

Setting up the aforementioned mechanical measuring means is difficult and time-consuming. This sometimes requires disassembling components, such as for example a mold, which then can no longer be measured together with the segment rollers. Often, indoor cranes/production cranes are used for setting up and in this time are not available to the possibly neighboring devices for production. This is accompanied by a great setting-up time and long production downtime.

Moreover, manual measurements of the individual rollers using micrometer screws or feeler gages take a long time. In addition, these measurements cannot be reproduced well and depend greatly on the operator. What is more, such measurements have a low accuracy, which depends on the type of straightedge, and only rarely achieve the accuracy of laser trackers. In addition, the mechanical measuring means must be checked annually. The state of the measuring means between these inspection intervals is unclear, in particular since no self-checking by the measuring means themselves takes place. Furthermore, evaluations of the measurement results are performed by a single person, usually using aids (software) provided by third parties and by manual documentation/logging.

WO 2007/017030A1 relates to a method for precisely positioning a number of interacting roll or roller elements of a rolling or casting device in relation to one another. By means of a measuring device, the distance between at least three reference points arranged directly or indirectly on each of the roll or roller elements and the measuring device is measured. In dependence on the measurement result, adjusting elements on each roll or roller element are actuated in such a way that the distances between the reference points and the measuring device match predetermined values as best as possible. The measuring points of each roll or roller element are arranged directly or indirectly on a carrier element of the roll or roller element.

WO 2013/186007A1 relates to a method for measuring the distance of a measuring position from a reference position, the distance measurement being carried out by the measuring beam of a laser tracker, the measuring position being marked before the actual distance measurement by the measuring beam and the distance measurement being carried out wirelessly.

EP 2574412A1 relates to a measuring probe for scanning a lateral surface of a cylindrical roller. The measuring probe usually has a probe with a sensing surface, a vertical guide profile, which is rigidly connected to the probe, a laser receiving unit with a detector array, a distance evaluation unit and a displacement measuring device for determining a vertical distance between the probe and the laser receiving unit. The laser receiving unit is displaceable in the vertical direction on the guide profile. The detector array is designed for the detection of a laser beam. The distance evaluation unit can determine a further vertical distance of the laser beam with respect to the laser receiving unit.

DE 102015224893A1 relates to a method for measuring the contour of a body in which a laser tracker system with a measuring ball, a measuring head and an evaluation device is used. The body is set in rotation about at least one axis of rotation, the measuring ball following a circumferential surface of the body. A laser beam from the measuring ball is reflected back to the measuring head. On the basis of this reflection, the contour of the body is determined by means of the evaluation device.

The publication "3-D-Koordinatenmesstechnik für die Kokillen- und Segmentwerkstatt" [3D coordinate measuring technique for mold and segment workshop] of the journal "Stahl und Eisen", issue February 2011, pages 39-45, discloses the use of a laser tracker for measuring the alignment of rollers of roller segments.

SUMMARY OF THE INVENTION

An object of the invention is to improve determination of an alignment of at least one object and relative alignment possibly based thereon of mold plates and mold rollers and also rollers of a segment of a strand guide.

Advantageous refinements are set out in the following description, and the figures, wherein these refinements, taken individually or in combination of at least two of these refinements, can represent a developmental, in particular also preferred or advantageous, aspect of the invention. Refinements of the device may in this case correspond to refinements of the system and of the method, and vice versa, even if in the individual case reference to this is not explicitly made to this below.

A device according to the invention for determining an alignment of at least one object comprises at least one measuring body, which reflects electromagnetic radiation and can be brought into physical contact with a surface of the object to determine the alignment, at least one measuring carriage, which can be moved along the object during the determination of the alignment and has a sliding surface that can be brought into physical contact with the object, at least one holding unit, which holds the measuring body and is connected to the measuring carriage so as to be able to pivot between a maximum position, in which the measuring body at least partially protrudes beyond the sliding surface on the object side, and a minimum position, in which the measuring body does not protrude beyond the sliding surface on the object side, and at least one restoring device, which applies a force to the holding unit in the direction of the maximum position.

According to the invention, the measuring body is easily held and guided by means of the measuring carriage, so that the measuring body does not have to be guided manually. As a result, the measuring accuracy and the reproducibility of measurement results become independent of any one person and are thereby improved. The device according to the invention allows for example tactile measuring of a number of rollers lying together of a roller segment with regard to the geometrical alignment of the rollers in relation to one another to be carried out without having to scan the full circumference of the rollers. With the invention, for example, alignment processes, such as for example measuring the alignment of rollers in relation to one another in the state in which they are fitted in a strand guide of a continuous casting installation, is made possible and is simplified and improved in comparison with previous conventional methods. This allows an optimum or correct alignment of a continuous casting installation in the assembled state.

As a result of its simplicity and the intuitive way in which it can be handled, the device according to the invention can even be operated by non-specialized persons. This minimizes the influence of the operator on the measurement. Moreover, with the device according to the invention, for example, measurements on roller tables, rolling stands or the like can be easily carried out, in particular measurements of surfaces of all kinds.

With the invention, the setting-up time for carrying out the measurement is therefore minimized, which is accompanied by an increase in production. Moreover, the use of the device according to the invention is possible without adversely affecting the production of neighboring installations, since no indoor/production crane is required. Moreover, there is the possibility of measuring a mold together with the roller segments and possibly a driver. The invention also offers the possibility of increasing safety at work, depending on the systems previously used. Moreover, adjustment measures can be performed without the device having to be dismantled. Consequently, quick repeat measurements are possible after adjustment measures have been undertaken.

The measuring body may also be referred to as a laser tracker reflector. The measuring body has at least one spherical reflection surface. The measuring body may for example be formed as a measuring ball. The measuring body serves for reflecting a laser beam of a laser tracker. During the measurement, the measuring carriage, in physical contact with the object, is guided along the object, so that the measuring body is pressed against the surface of the object by means of the restoring device and in this way can reliably follow the contour or the shaping of this surface. The device may also comprise two or more measuring bodies, whereby a number of measuring tracks can be realized at the same time if a number of laser trackers are used.

During the determination of the alignment of the object or the measurement of the surface of the object, the measuring carriage slides over the surface of the object by means of its sliding surface. The measuring carriage is preferably formed in such a way that it cannot tilt about the sliding direction. The measuring carriage is preferably formed in a lightweight manner, for example is partially or completely produced from a lightweight metal. The measuring carriage may be produced by using as many standard parts and/or nonvariable parts as possible. Moreover, the mechanics between the measuring carriage and the holding unit can be formed as simply as possible, in order to ensure the proper functioning of the device. To secure screws and components that do not serve for the pivoting of the measuring body and are not adjusted, a screw adhesive may be used.

In order that the measuring carriage does not tilt when it slides over a number of rollers arranged one behind the other in series, it must be sufficiently long. The length of the sliding surface of the measuring carriage is chosen such that it rests on at least three rollers, in order not to tilt when it passes over between rollers. Nevertheless, the measuring carriage should not be too long, in order to maintain the transportability of the measuring carriage. The height of the measuring carriage may be for example about 65 mm, in particular in order also to be able to measure CSP® (Compact Strip Production) installations with the device according to the invention without removing the mold. The measuring carriage may for example cover a width of 680 mm, so that in most continuous casting installations the measuring carriage covers over more than one roller in spite of bearing gaps of divided rollers.

The holding unit may be formed so as to hold the measuring body in an exchangeable manner, in order to be able whenever required to adapt the device to the respective application and/or repair it by exchanging the measuring body. With the holding device in its maximum position, the measuring body may partially or completely protrude beyond the sliding surface of the measuring carriage on the object side. With the holding unit in its minimum position, the measuring body may be displaced completely in relation to the sliding surface on the side away from the object or its side that is arranged closest to the object may lie in a plane that is defined by the sliding surface. The maximum position of the holding unit may be adjustable, in particular steplessly, in order to be able to adapt the device to the respective continuous casting installation without restrictions and without compromises.

The restoring device ensures that the measuring body does not lose contact with the object during the measurement. The restoring device may comprise at least one spring element or generate the restoring force on the basis of a non-mechanical principle.

The object may be for example a roller of a roller segment of a strand guide of a continuous casting installation or a of a roller table of a rolling mill or a roller of some other device for handling a metal strand. Alternatively, the object may be a component (copper plate) of a mold or the mold itself. The device according to the invention may be used for carrying out the measurement in an alignment workshop, test workshop, repair workshop or in some other measuring room.

According to an advantageous refinement, the measuring carriage comprises at least two skids, which are arranged parallel to one another and at a distance from one another and define the sliding surface, and at least one crosspiece, which connects the skids rigidly to one another and is aligned transversely in relation to the skids, the holding unit being connected to the measuring carriage pivotably about a pivot axis aligned transversely in relation to the skids and parallel to the crosspiece. The measuring carriage may also comprise three skids, which are arranged parallel to one another and at a distance from one another and define the sliding surface. This can reliably prevent the measuring carriage from tilting or canting when it slides over a bearing location. In order to ensure that a maximum of only a single skid is in a bearing location, the measuring carriage may for example have a width of 680 mm, so that in the direction of its width the measuring carriage covers over more than one roller in most continuous casting installations.

According to a further advantageous refinement, at least one magnet is arranged on the measuring carriage. This is of advantage in the case of a ferromagnetic object, since the measuring carriage is drawn by means of the magnet up to the object, in order to be able to be reliably guided on it and not come away from the object unwantedly. The magnet may for example be formed as a magnetic rail. This achieves a two-dimensional magnetic force, which is important especially for round adhering bodies, such as for example a roller. Two or more magnets may be arranged on the measuring carriage. In particular, the magnets may be arranged on the outer skids of the measuring carriage. The magnets may be formed in a rectangular manner and be adhesively secured in spars of the skids or in spars carrying skids only from a lower region up to a middle region. If the magnetic force is not sufficient to press the measuring carriage against the rollers, further magnets may be adhesively secured or added. If, for measuring, the measuring carriage is for example let down vertically onto the rollers, it attaches itself to the rollers from the beginning of the measurement. If the measuring body makes contact with a roller, it is in contact with the roller from beginning to end.

According to a further advantageous refinement, the device comprises at least one movement device, which is connected to the measuring carriage and with which the measuring carriage can be moved vertically along the object during the determination of the alignment. The movement device may comprise a flexible element, for example a cable or a chain, on which the measuring carriage is suspended. Moreover, the movement device may comprise a manually or automatically actuable cable winch and/or a cable guide or a chain guide. The measurement may take place during a vertical upward movement and/or during a vertical downward movement of the measuring carriage.

A system according to the invention for determining an alignment of at least one object comprises at least one laser tracker, at least one evaluation device evaluating measuring signals of the laser tracker and at least one device according to one of the aforementioned refinements or a combination of at least two of these refinements with one another, the laser tracker being designed to follow the measuring body during its movement along a surface of the object.

The advantages stated above with reference to the device are correspondingly associated with the system. The system makes possible an automated evaluation of the measurement data of the laser tracker with minimal user intervention. Moreover, with the system, automated documentation of the measurement data and/or automated error detection, error avoidance and error limitation are possible. With the system, a digital measuring process which delivers fast, accurate and reproducible measurement results can be carried out.

The laser tracker automatically follows the measuring body with its laser beam and continuously or discontinuously records measured values in the x, y and z directions and transmits these values to the (external) evaluation device, which may comprise at least one computing unit and/or at least one memory unit. The measurement results are analyzed by the evaluation device. In this case, the contour that has been measured can be calculated and graphically displayed. The graphic display of the contour may form the basis for the alignment of the components, an operator being able to read off directly which adjusting measures are required.

In the evaluation of the measuring signals of the laser tracker by the evaluation device, various mathematical methods may be used, in order for example to be able to calculate additionally the contact point of the roller with the metal strand. As a result, the "trailing edge of the strand" can be calculated with respect to a desired dimension. The focus here is on the evaluation of the recorded point cloud. On the basis of this, the quality of the scans can be determined. By adapting various parameters, the degree of automation can be influenced. By means of these parameters, it is possible for acceptance criteria and/or quality criteria for carrying out the measurement to be established.

A method according to the invention for the relative alignment of copper plates of molds and of rollers of a segment of a roller guide comprises the steps of:
 determining the relative alignment of the copper plates or the rollers by using an aforementioned system; and
 aligning the copper plates or the rollers while taking into account a result of the determination carried out with the system.

The advantages stated above with reference to the system or the device are correspondingly associated with the method.

BRIEF DESCRIPTION OF THE DRAWING

The invention is explained below by way of example with reference to the accompanying figures on the basis of a preferred embodiment, while the features explained below may constitute an advantageous or developmental aspect of the invention either on their own or in combination of at least two of these features together. In the figures.

DETAILED DESCRIPTION OF THE INVENTION

In the figures, components that are the same or functionally the same are provided with the same designations. There is no need for a repeated description of these components.

Figure 1:
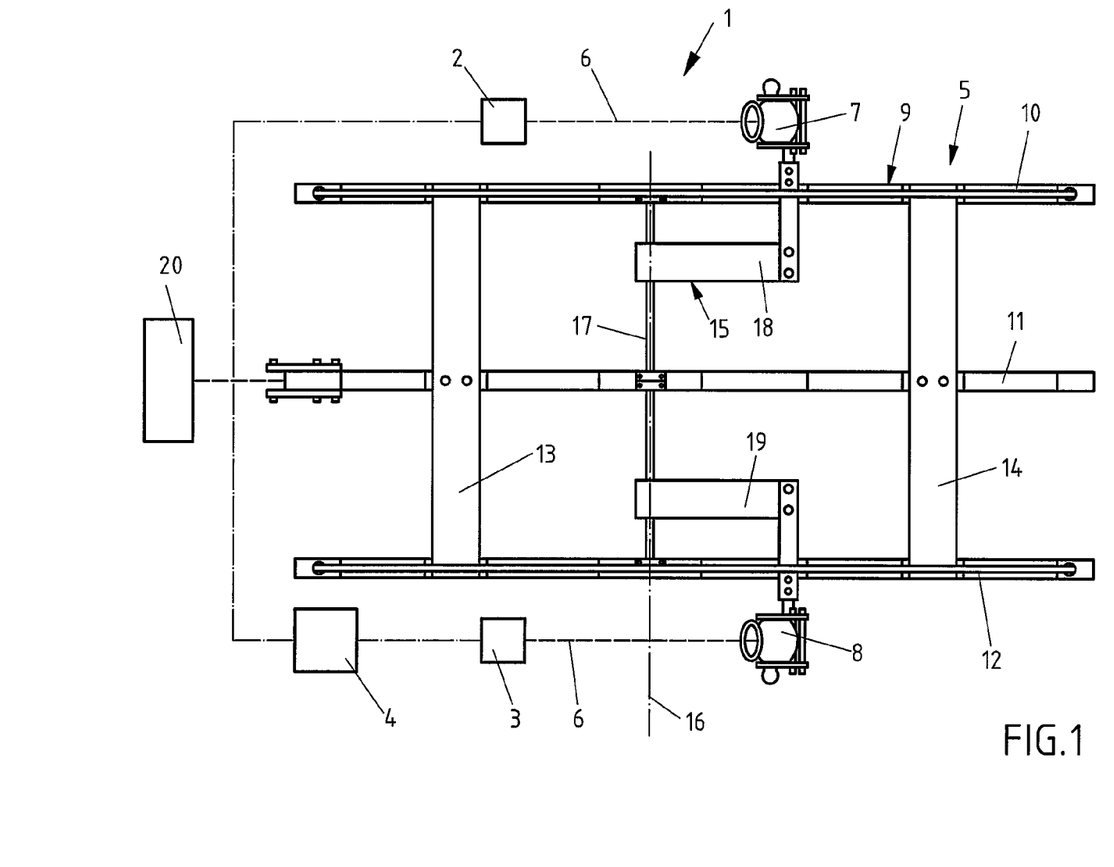
FIG. 1 shows a schematic plan view of an exemplary embodiment of a system according to the invention.
Figure 5:
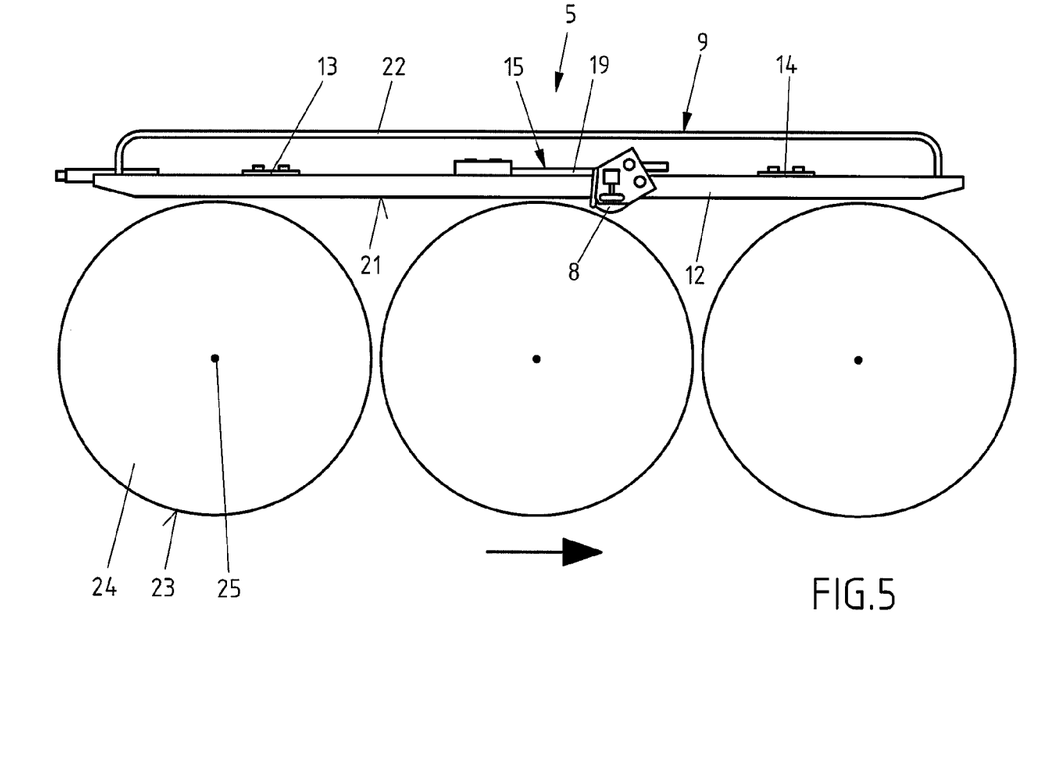
FIG. 5 shows a schematic representation of an example of the use of the device shown in FIG. 1.

FIG. 1 shows a schematic plan view of an exemplary embodiment of a system 1 according to the invention for determining an alignment of at least one object that is not shown. An application of the system 1 given by way of example is shown in FIG. 5.

The system 1 comprises one or optionally also two laser trackers 2 and 3 and an evaluation device 4, which evaluates measuring signals of the laser trackers 2 and 3. Furthermore, the system 1 comprises a device 5 for determining the alignment of the object. The laser trackers 2 and 3 respectively emit laser light 6.

The device 5 comprises two measuring bodies 7 and 8, which reflect electromagnetic radiation, are respectively formed as a measuring ball and can be brought into physical contact with a surface of the object that is not shown to determine the alignment.

Moreover, the device 5 comprises a measuring carriage 9, which can be moved along the object during the determination of the alignment and has a sliding surface that can be brought into physical contact with the object, facing away from the viewer in FIG. 1. The measuring carriage 9 comprises three skids 10, 11 and 12, which are arranged parallel to one another and at a distance from one another and define the sliding surface, and two crosspieces 13 and 14, which connect the skids 10, 11 and 12 rigidly to one another and are aligned transversely in relation to the skids 10, 11 and 12. A number of magnets that are not shown are arranged on the measuring carriage 9, in particular on the skids 10 and 12.

The device 5 also comprises a holding unit 15, which holds the measuring bodies 7 and 8 and is connected to the measuring carriage 9 so as to be able to pivot between a maximum position, shown in FIGS. 1 to 5, in which the measuring bodies 7 and 8 at least partially protrude beyond the sliding surface on the object side, and a minimum position that is not shown, in which the measuring bodies 7 and 8 do not protrude beyond the sliding surface on the object side. In this case, the holding unit 15 is connected to the measuring carriage 9 pivotably about a pivot axis 16 aligned transversely in relation to the skids 10, 11 and 12 and parallel to the crosspieces 13 and 14. The holding unit has a fixed spindle 17, which runs transversely in relation to the skids 10, 11 and 12 and on which two holding levers 18 and 19 formed in an L-shaped manner are mounted pivotably about the pivot axis 16 independently of one another. The holding levers 18 and 19 respectively hold a measuring body 7 and 8.

Furthermore, the device 5 comprises at least one restoring device that is not shown, which applies a force to the holding unit 15 in the direction of the maximum position.

The device also comprises a movement device 20, which is connected to the measuring carriage 9 and with which the measuring carriage 9 can be moved vertically along the object during the determination of the alignment.

At least for the most part, the device 5 has frictional connections. The laser trackers 2 and 3 are designed to follow the respective measuring body 7 or 8 during its movement along the surface of the object.

Figure 2:
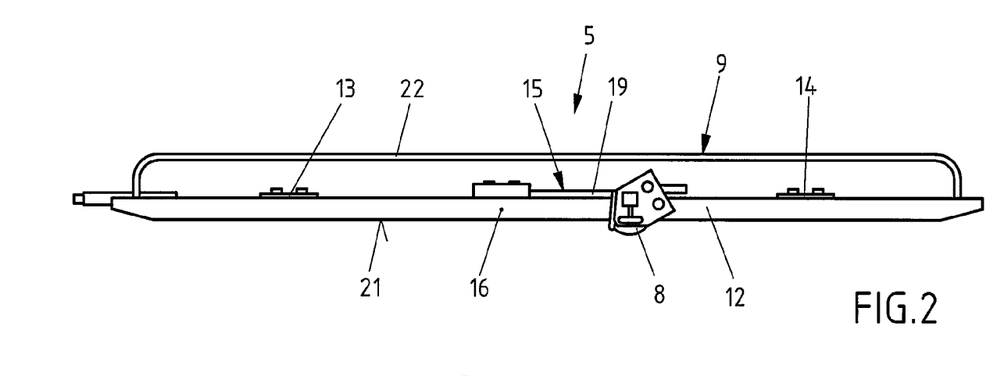
FIG. 2 shows a schematic side view of the device shown in FIG. 1.

FIG. 2 shows a schematic side view of the device 5 shown in FIG. 1. It can be seen that, with the holding unit 15 in its maximum position shown, the measuring bodies, of which only the measuring body 8 can be seen in FIG. 2, partially protrude beyond the sliding surface 21 of the measuring carriage 9 on the object side. It can also be seen that respectively arranged on the outer skids, of which only the skid 12 can be seen in FIG. 2, is a guard 22 for protecting the measuring carriage 9 and the crosspieces 13, 14 for stiffening.

Figure 3:
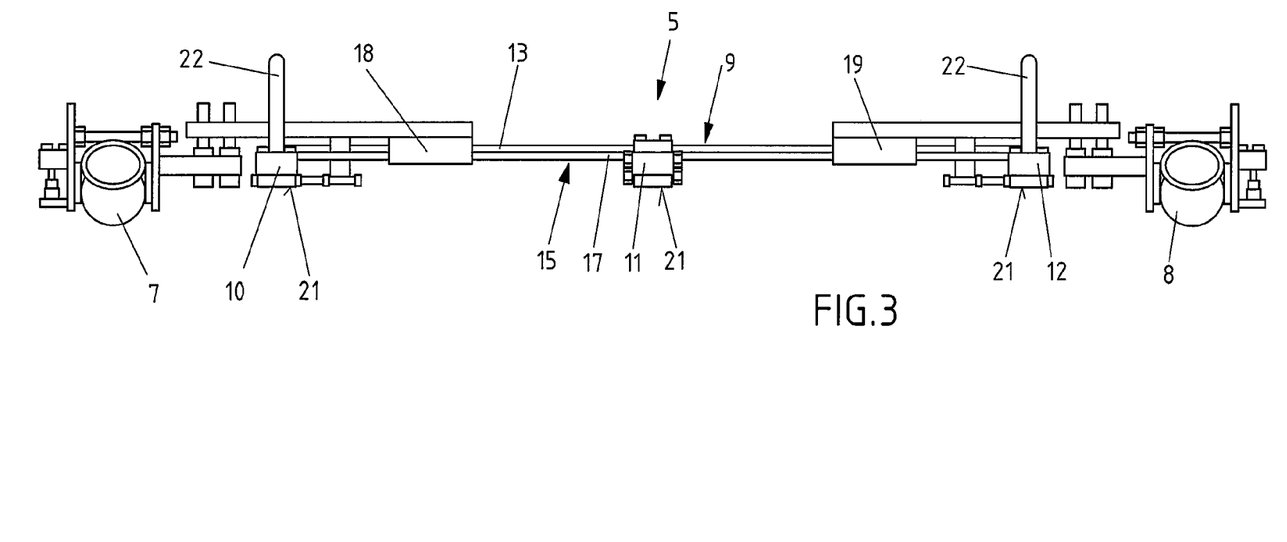
FIG. 3 shows a schematic front view of the device shown in FIG. 1.

FIG. 3 shows a schematic front view of the device 5 shown in FIG. 1. The sliding surface 21 formed by the three skids 10, 11 and 12 is shown.

Figure 4:
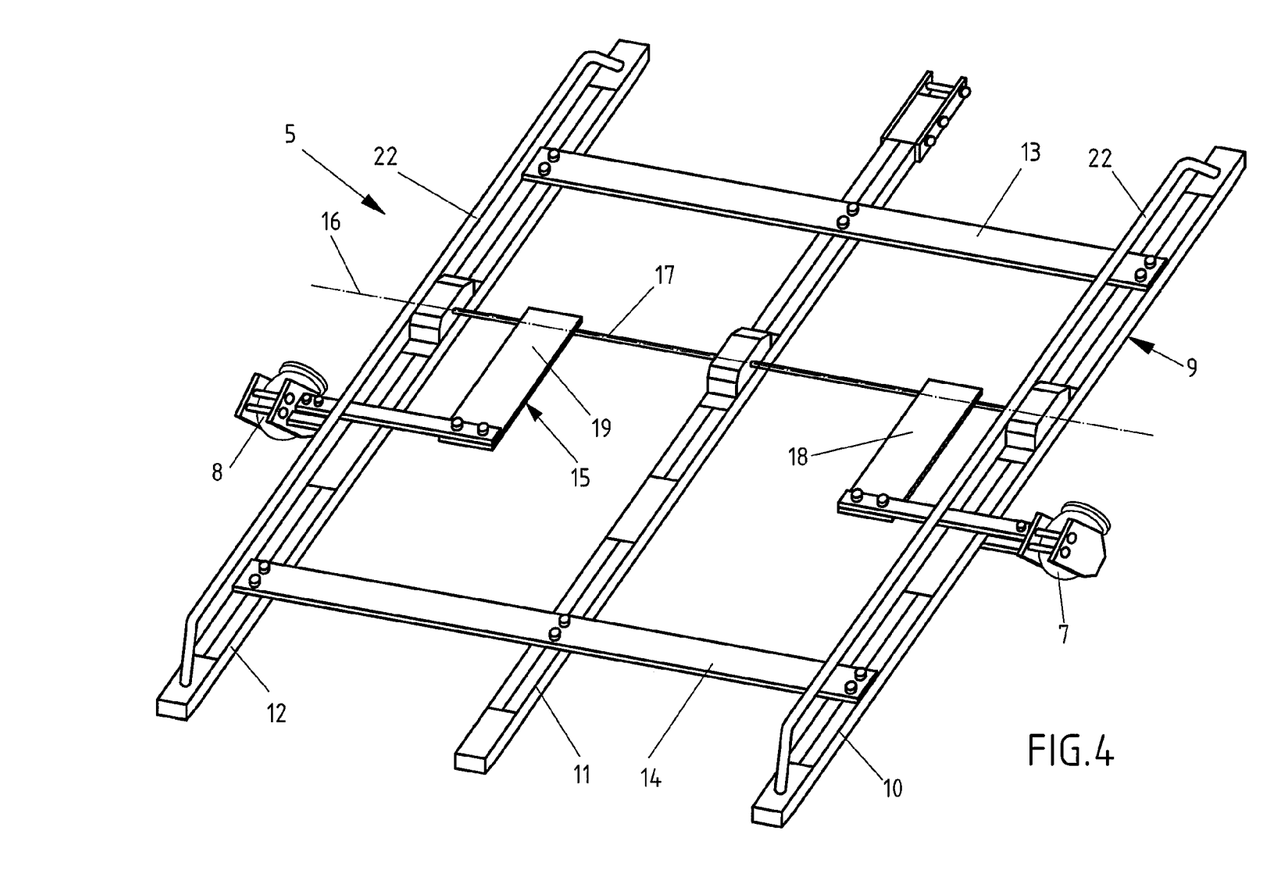
FIG. 4 shows a schematic and perspective representation of the device shown in FIG. 1 obliquely from above.

FIG. 4 shows a schematic and perspective representation of the device 5 shown in FIG. 1 obliquely from above.

FIG. 5 shows a schematic representation of an example of the use of the device 5 shown in FIG. 1. The device 5 is used for determining the relative alignment of the rollers 24, for which purpose the measuring bodies 7 and 8 are brought into physical contact with the surfaces 23 of the rollers 24. The length of the measuring carriage 9 is longer than the distance between the longitudinal center axis 25 of the two outer rollers 24, which are separated from one another by the middle roller 24.

LIST OF DESIGNATIONS

1 System
2 Laser tracker
3 Laser tracker
4 Evaluation device
5 Device
6 Laser light
7 Measuring body
8 Measuring body
9 Measuring carriage
10 Skid
11 Skid
12 Skid
13 Crosspiece
14 Crosspiece
15 Holding unit
16 Pivot axis
17 Fixed spindle
18 Holding lever
19 Holding lever
20 Movement device
21 Sliding surface of 9
22 Guard
23 Surface
24 Roller (object)
25 Longitudinal center axis of 24
26 Attachment point

The invention claimed is:

1. A device for determining an alignment of at least one object, comprising:

at least one measuring body that reflects electromagnetic radiation and is bringable into physical contact with a surface of the at least one object to determine the alignment;

at least one measuring carriage that is movable along the at least one object during the determination of the alignment and has a sliding surface physically contactable contact with the at least one object;

at least one holding unit that holds the at least one measuring body and is connected to the at least one measuring carriage so as to be pivotable between a maximum position, in which the at least one measuring body at least partially protrudes beyond the sliding surface on an object side, and a minimum position, in which the at least one measuring body does not protrude beyond the sliding surface on the object side; and at least one restoring device configured to apply a force to the at least one holding unit in a direction of the maximum position.

2. The device according to claim 1, wherein the at least one measuring carriage comprises at least two skids that are arranged parallel to one another and at a distance from one another and define the sliding surface, and at least one crosspiece that connects the at least two skids rigidly to one another and is aligned transversely in relation to the at least two skids, the at least one holding unit being connected to the at least one measuring carriage pivotably about a pivot axis aligned transversely in relation to the at least two skids and parallel to the at least one crosspiece.

3. The device according to claim 1, wherein at least one magnet is arranged on the at least one measuring carriage.

4. The device according to claim 1, further comprising at least one movement device that is connected to the at least one measuring carriage, the at least one movement device being configured to move the at least one measuring carriage vertically along the at least one object during the determination of the alignment.

5. The device according to claim 1, wherein the device has frictional connections.

6. A system for determining an alignment of at least one object, comprising: at least one laser tracker; at least one evaluation device that evaluates measuring signals of the at least one laser tracker; and a device according to claim 1, the at least one laser tracker being configured to follow the at least one measuring body during movement of the at least one measuring body along the surface of the at least one object.

7. A method for relatively aligning rollers of a segment of a roller guide, comprising the steps of:
determining the relative alignment of the rollers by using a system according to claim 6; and
aligning the rollers taking into account a result of the determination carried out with the system.

* * * * *